United States Patent [19]

Itoh et al.

[11] Patent Number: 4,595,948

[45] Date of Patent: Jun. 17, 1986

[54] MULTICOLOR INK JET RECORDING APPARATUS HAVING MEANS FOR PREVENTING BLURRING OF INK

[75] Inventors: Tadashi Itoh; Toshiharu Murai, both of Yokohama; Koichiro Jinnai, Kawasaki; Kazumi Ishima, Kashiwa; Takahisa Koike, Tokyo; Toshifumi Kato, Tokyo; Takao Fukazawa, Tokyo, all of Japan

[73] Assignee: Ricoh Company, Ltd., Tokyo, Japan

[21] Appl. No.: 541,205

[22] Filed: Oct. 12, 1983

[30] Foreign Application Priority Data

Oct. 13, 1982 [JP] Japan ................. 57-179333

[51] Int. Cl.⁴ .................. H04N 1/46; G01D 9/00; G01D 15/18

[52] U.S. Cl. ................... 358/75; 358/78; 346/1.1; 346/140 R

[58] Field of Search ............ 358/75, 78, 80, 75 IJ; 346/1.1, 75, 140 PD

[56] References Cited

U.S. PATENT DOCUMENTS 4,367,482 1/1983 Heinzl ............... 346/140 PD
4,412,225 10/1983 Yoshida et al. ......... 358/75

FOREIGN PATENT DOCUMENTS 146361 11/1981 Japan ................. 358/75

Primary Examiner—James J. Groody
Assistant Examiner—Randall S. Svihla
Attorney, Agent, or Firm—David G. Alexander

[57] ABSTRACT

An ink jet head prints an image by superposing individual dot matrices of at least two colors. A computing unit receives electrical input signals representing the image and generates and feeds corresponding electrical signals representing the individual matrices of the at least two colors to the head means for printing. The computing means includes matrix generator means for generating the matrices in such a manner that the total number of dots to be printed in all of the matrices is limited to a first predetermined value which is less than the maximum possible total number of dots which can be printed in all of said individual dot matrices, and the total number of dots to be printed in the matrices which are formed by superposed dots of different colors is limited to a second predetermined value which is less than said first predetermined value.

8 Claims, 17 Drawing Figures

FIG. 9

| | 1 | 2 | 3 | 4 |
|---|---|---|---|---|
| 1 | 1 | 9 | 3 | 11 |
| 2 | 13 | 5 | 15 | 7 |
| 3 | 4 | 12 | 2 | 10 |
| 4 | 16 | 8 | 14 | 6 |

FIG. 10a

| | 1 | 2 | 3 | 4 |
|---|---|---|---|---|
| 1 | 1 | 7 | 12 | 2 |
| 2 | 5 | 16 | 14 | 9 |
| 3 | 13 | 3 | 6 | 11 |
| 4 | 10 | 8 | 4 | 15 |

FIG. 10b

| | 1 | 2 | 3 | 4 |
|---|---|---|---|---|
| 1 | 11 | 7 | 5 | 9 |
| 2 | 13 | 3 | 1 | 15 |
| 3 | 10 | 16 | 12 | 6 |
| 4 | 4 | 8 | 14 | 2 |

FIG. 10c

| | 1 | 2 | 3 | 4 |
|---|---|---|---|---|
| 1 | 15 | 13 | 8 | 16 |
| 2 | 7 | 3 | 12 | 1 |
| 3 | 2 | 4 | 6 | 9 |
| 4 | 14 | 11 | 5 | 10 |

FIG.11a

|   | 1 | 2 | 3 | 4 |
|---|---|---|---|---|
| 1 | 7 | 13 | 8 | 14 |
| 2 | 12 | 1 | 2 | 9 |
| 3 | 6 | 11 | 10 | 3 |
| 4 | 16 | 5 | 4 | 15 |

FIG.11b

|   | 1 | 2 | 3 | 4 |
|---|---|---|---|---|
| 1 | 16 | 5 | 4 | 15 |
| 2 | 6 | 12 | 11 | 3 |
| 3 | 13 | 1 | 2 | 10 |
| 4 | 7 | 14 | 8 | 9 |

FIG.11c

|   | 1 | 2 | 3 | 4 |
|---|---|---|---|---|
| 1 | 5 | 3 | 14 | 2 |
| 2 | 9 | 10 | 11 | 7 |
| 3 | 8 | 15 | 13 | 12 |
| 4 | 6 | 1 | 16 | 4 |

FIG.13

|   | 1 | 2 | 3 | 4 |
|---|---|---|---|---|
| 1 | 12 | 14 | 17 | 11 |
| 2 | 18 | 19 | 15 | 24 |
| 3 | 23 | 19 | 18 | 17 |
| 4 | 14 | 16 | 18 | 17 |

MULTICOLOR INK JET RECORDING APPARATUS HAVING MEANS FOR PREVENTING BLURRING OF INK

BACKGROUND OF THE INVENTION

The present invention relates to a color ink jet recording method and apparatus which supplies a plurality of ink ejection heads with ink of different colors so as to selectively print out dots on a sheet in response to input color signals. More particularly, the present invention relates to a color ink jet recording method for reproducing on a sheet a halftone color image by regulating the density of dots to be formed on a sheet.

Prior art color ink jet recording methods include one disclosed in Japanese Unexamined Patent Publication (Kokai) No. 56-146361. In this prior art method, print dot patterns corresponding to color densities (dot patterns in a matrix or pixel having a predetermined number of elements) are assigned to each color, so that specific one of the patterns may be selected to print out dots as specified by color density instruction.

With the method described above, it is possible to record color data with gradation from a low density to a medium density and monochromatic data over the entire gradation. However, regarding color ink jet recording which prints out dots of two or more colors in a same matrix, if dots zero to k (k being the number of elements in the matrix) are simply printed out in response to an input level of each color, the dots will join each other, blur or even flow on the sheet when data is reproduced to a relatively high density. For example, when all the three colors, yellow, magenta and cyan, are at the highest level, ink of the three different colors will be printed out one upon another. In practice, the flow or the blur of ink may be overcome by replacing at least part of yellow (Y), magenta (M) and cyan (C) dots by black (BK) dots. However, when yellow (Y) and magenta (M) are at the highest level for example, ink of the two colors will become superposed in each element of the matrix resulting in the flow or the blur of the ink.

SUMMARY OF THE INVENTION

It is therefore an object of the present invention to provide a color ink jet recording method which is capable of eliminating the flow or the blur of ink even when reproducing gradation with high densities.

It is another object of the present invention to provide a color ink jet recording method which is capable of essentially increasing the range available for multicolor, multitone data reproduction.

It is another object of the present invention to provide a generally improved color ink jet recording method.

In accordance with the present invention, a multicolor ink jet recording method reproduces a multicolor, multitone image with a dot matrix by printing out at least two dots on a recording medium. The maximum number of elements in a matrix or pixel in which dots are to be printed one upon another is limited, or the maximum number of print dots in a matrix is limited. Numbers of dots are assigned to respective colors within the limited range. The range available for the reproduction of gradation is increased in effect, because the numbers of print dots of the respective colors are determined within the control range.

The above and other objects, features and advantages of the present invention will become apparent from the following detailed description taken with the accompanying drawings.

DESCRIPTION OF THE DRAWINGS

FIG. 9 is a view of an example of prior art threshold matrixes;

FIGS. 10a, 10b, 10c, and 11a, 11b, 11c are views of threshold matrixes in accordance with the present invention;

FIG. 13 is a view of a matrix representing values provided by an adder.

DESCRIPTION OF THE PREFFERED EMBODIMENTS

While the multicolor ink jet recording method of the present invention is susceptible of numerous physical embodiments, depending upon the environment and requirements of use, substantial numbers of the herein shown and described embodiments have been made, tested and used, and all have performed in an eminently satisfactory manner.

In a multicolor ink jet printer, ink ejection heads are respectively allocated to three primary colors (yellow Y, magenta M and cyan C) and selectively activated to print out dots in accordance with the levels of signals which represent the three colors. Other three primary color signals such as red R, blue B and green G signals or NTSC signals used with color scanners, television, video, laser disc and the like are converted into the Y, M and C signals in advance.

Figure 1:
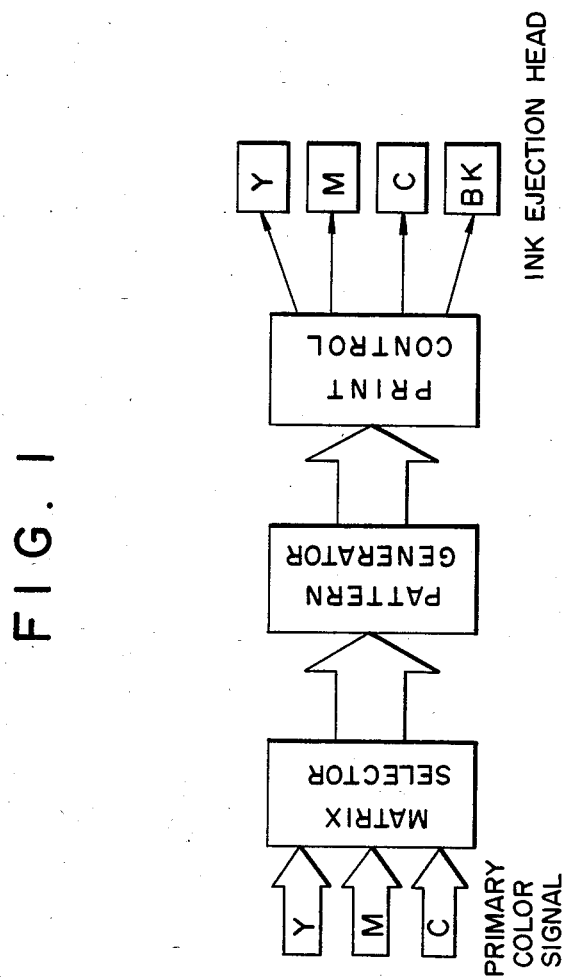
FIG. 1 is a block diagram schematically showing a color ink jet recording apparatus to which the present invention is applicable.

To represent an input signal by a dot matrix element by element, the Y, M and C signals are supplied to a matrix selector as shown in FIG. 1. The matrix selector selects a specific matrix in response to the input and causes a pattern or matrix generator to send out the selected matrix to a print control circuit. Ink ejection heads are driven by the print control to individually eject ink of different colors. Black BK is employed in addition to yellow Y, magenta M and cyan C because the three primary colors Y, M and C are usually incapable of providing sufficient representation of a range close to achromatic color (high grayness range) or a high density range (low brightness range).

Figure 2:
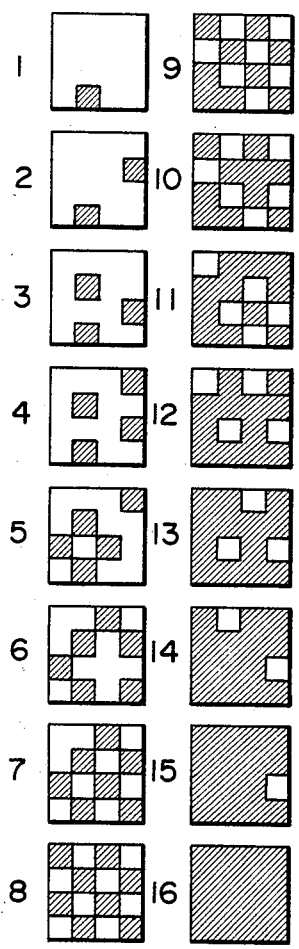
FIGS. 2 and 3 are plan views of dot patterns allocated to a matrix.

The simplest method available for the representation of gradation which uses dot matrixes is shown in FIG. 2. The method is to select specific one of different dot matrixes in response to an input signal level. In the example shown in FIG. 2, the input signal representing each color has sixteen levels and the matrix, sixteen elements (4×4). Generally, where the matrix has n×m elements, the method described is capable of reproducing gradation with "n×m+1" different tones inclusive of blank (white). However, a problem is brought about when it is desired to print out a pattern in a mixture of two or more different colors, as previously discussed.

When the patterns shown in FIG. 2 were printed out by ejecting ink of two different colors one after the other, the amount of mist around the matrix was found to increase with the number of dots. The increase in mist made the dots in the matrix hard to discriminate and soon allowed the dots to blur. A farther increase in the number of dots caused the ink to flow on a medium. Reducing an area where dots in different colors are printed out one upon another, that is, locating dots in different places in the matrix, may somewhat alleviate the problem but does not solve it. Where the total number of two numbers of dots exceeds sixteen, superposed printing cannot be avoided. Therefore, a mixture pattern in two or more colors requires the number of dots and that of superposed printings to be limited in the matrix. The limit point depends upon various factors such as the size of ink drops, characteristics (viscosity, surface tension) of ink, properties of a sheet (surface condition, water absorption, etc.), and force with which an ink drop impinges on a sheet (proportional to velocity and mass).

In accordance with one embodiment of the present invention, patterns are prepared predetermining the maximum dot numbers in the matrix and the maximum superposed dot numbers as shown in Table 1. The matrix employed here is the 4×4 matrix.

TABLE 1

| MAX DOT NUMBER | MAX SUPERPOSED DOT NUMBER |
|---|---|
| 22 | 6 |
| 21 | 6 |
| 20 | 6 |
| 19 | 6 |
| 18 | 7 |
| 17 | 8 |

Note:
The maximum dot number is twenty-two because twenty-three dots increases the superposed dot number beyond seven. The maximum superposed dot number is 8.

TABLE 2

| COLOR 1 | COLOR 2 | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 |
| 2 | 2-1 | 1-1 | 1-2 | 2-4 | 2-5 | 2-6 | 2-7 | 2-8 | 2-9 | 2-10 | 2-11 | 2-12 | 2-13 | 2-14 | 2-15 | 2-16 |
| 3 | 3-1 | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 |
| 4 | 4-1 | 4-2 | 3-2 | 3-3 | 3-4 | 3-5 | 3-6 | 3-7 | 3-8 | 3-9 | 3-10 | 3-11 | 3-12 | 3-13 | 3-14 | 3-15 |
| 5 | 5-1 | 5-2 | 4-2 | 4-3 | 4-4 | 3-4 | 3-5 | 4-7 | 4-8 | 4-9 | 3-9 | 3-10 | 4-12 | 3-12 | 4-14 | 4-15 |
| 6 | 6-1 | 6-2 | 5-2 | 5-3 | 4-3 | 4-4 | 4-5 | 4-6 | 4-7 | 4-8 | 4-9 | 4-10 | 4-11 | 4-12 | 4-13 | 4-14 |
| 7 | 7-1 | 7-2 | 6-2 | 6-3 | 5-3 | 5-4 | 5-5 | 5-6 | 5-7 | 5-8 | 5-9 | 5-10 | 5-11 | 5-12 | 5-13 | 5-14 |
| 8 | 8-1 | 8-2 | 7-2 | 7-3 | 7-4 | 6-4 | 6-5 | 6-6 | 6-7 | 6-8 | 5-8 | 5-9 | 6-11 | 5-11 | 6-13 | 6-14 |
| 9 | 9-1 | 9-2 | 8-2 | 8-3 | 8-4 | 7-4 | 7-5 | 7-6 | 6-6 | 6-7 | 6-8 | 6-9 | 6-10 | 6-11 | 6-12 | 6-13 |
| 10 | 10-1 | 10-2 | 9-2 | 9-3 | 9-4 | 8-4 | 8-5 | 8-6 | 7-6 | 7-7 | 6-7 | 7-9 | 7-10 | 6-10 | 7-12 | 7-13 |
| 11 | 11-1 | 11-2 | 10-2 | 10-3 | 9-3 | 9-4 | 9-5 | 8-5 | 8-6 | 7-6 | 7-7 | 7-8 | 8-10 | 7-10 | 7-11 | 8-13 |
| 12 | 12-1 | 12-2 | 11-2 | 11-3 | 10-3 | 10-4 | 10-5 | 9-5 | 9-6 | 9-7 | 8-7 | 8-8 | 8-9 | 8-10 | 8-11 | 8-12 |
| 13 | 13-1 | 13-2 | 12-2 | 12-3 | 12-4 | 11-4 | 11-5 | 11-6 | 10-6 | 10-7 | 10-8 | 9-8 | 9-9 | 8-9 | 9-11 | 9-12 |
| 14 | 14-1 | 14-2 | 13-2 | 13-3 | 12-3 | 12-4 | 12-5 | 11-5 | 11-6 | 10-6 | 10-7 | 10-8 | 9-8 | 9-9 | 9-10 | 10-12 |
| 15 | 15-1 | 15-2 | 14-2 | 14-3 | 14-4 | 13-4 | 13-5 | 13-6 | 12-6 | 12-7 | 11-7 | 11-8 | 11-9 | 10-9 | 10-10 | 10-11 |
| 16 | 16-1 | 16-2 | 15-2 | 15-3 | 15-4 | 14-4 | 14-5 | 14-6 | 13-6 | 13-7 | 13-8 | 12-8 | 12-9 | 12-10 | 11-10 | 11-1 |

TABLE 3-1

| COLOR M | COLOR C | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 16 | 15 | 15 | 15 | 14 | 14 | 14 | 13 | 13 | 13 | 13 | 12 | 12 | 12 | 11 | 11 |
| | 1 | 1 | 1 | 1 | 1 | 1 | 1 | 1 | 0 | 0 | 0 | 0 | 0 | 0 | 0 | 0 |
| | 1 | 1 | 2 | 3 | 3 | 4 | 5 | 5 | 6 | 7 | 8 | 8 | 9 | 10 | 10 | 11 |
| 2 | 15 | 15 | 15 | 14 | 14 | 14 | 13 | 13 | 13 | 12 | 12 | 11 | 11 | 11 | 10 | 10 |
| | 1 | 1 | 1 | 1 | 1 | 1 | 1 | 1 | 1 | 1 | 1 | 1 | 1 | 1 | 1 | 1 |
| | 1 | 1 | 1 | 2 | 2 | 3 | 4 | 4 | 5 | 6 | 7 | 7 | 8 | 9 | 9 | 10 |
| 3 | 15 | 15 | 14 | 14 | 13 | 13 | 13 | 12 | 12 | 12 | 12 | 11 | 11 | 11 | 10 | 10 |
| | 2 | 2 | 1 | 1 | 1 | 1 | 1 | 1 | 1 | 1 | 1 | 1 | 1 | 1 | 1 | 1 |
| | 1 | 1 | 1 | 2 | 2 | 3 | 4 | 4 | 5 | 6 | 7 | 7 | 8 | 9 | 9 | 10 |
| 4 | 15 | 14 | 14 | 14 | 14 | 13 | 13 | 13 | 12 | 12 | 12 | 11 | 11 | 11 | 10 | 10 |
| | 3 | 2 | 2 | 2 | 2 | 2 | 2 | 2 | 2 | 2 | 2 | 2 | 2 | 2 | 2 | 2 |
| | 1 | 1 | 1 | 2 | 3 | 3 | 4 | 5 | 5 | 6 | 6 | 7 | 8 | 8 | 9 | 10 |
| 5 | 14 | 14 | 13 | 14 | 13 | 13 | 12 | 12 | 12 | 12 | 11 | 11 | 11 | 11 | 10 | 10 |
| | 3 | 3 | 3 | 2 | 3 | 2 | 2 | 2 | 2 | 2 | 2 | 2 | 2 | 2 | 2 | 2 |
| | 1 | 1 | 1 | 2 | 2 | 3 | 3 | 4 | 5 | 6 | 6 | 7 | 8 | 8 | 9 | 10 |
| 6 | 14 | 14 | 13 | 13 | 13 | 13 | 13 | 12 | 12 | 11 | 11 | 11 | 10 | 10 | 9 | 9 |
| | 4 | 4 | 3 | 3 | 3 | 3 | 3 | 3 | 3 | 3 | 3 | 3 | 3 | 3 | 3 | 3 |
| | 1 | 1 | 1 | 2 | 2 | 3 | 4 | 4 | 5 | 5 | 6 | 7 | 7 | 8 | 8 | 9 |
| 7 | 14 | 13 | 13 | 13 | 12 | 13 | 12 | 12 | 11 | 11 | 11 | 10 | 10 | 10 | 9 | 9 |
| | 5 | 4 | 4 | 4 | 3 | 4 | 3 | 3 | 3 | 3 | 3 | 3 | 3 | 3 | 3 | 3 |
| | 1 | 1 | 1 | 2 | 2 | 3 | 3 | 4 | 4 | 5 | 6 | 6 | 7 | 8 | 8 | 9 |
| 8 | 13 | 13 | 12 | 13 | 12 | 12 | 12 | 11 | 11 | 10 | 10 | 10 | 10 | 9 | 9 | 9 |
| | 5 | 5 | 4 | 5 | 4 | 4 | 4 | 3 | 3 | 3 | 3 | 3 | 3 | 3 | 3 | 3 |
| | 0 | 1 | 1 | 2 | 2 | 3 | 3 | 3 | 4 | 4 | 5 | 6 | 6 | 7 | 8 | 9 |
| 9 | 13 | 13 | 12 | 12 | 12 | 12 | 11 | 11 | 11 | 11 | 10 | 10 | 10 | 10 | 9 | 9 |
| | 6 | 5 | 5 | 5 | 5 | 5 | 4 | 4 | 4 | 4 | 4 | 4 | 4 | 4 | 4 | 4 |
| | 0 | 1 | 1 | 2 | 2 | 3 | 3 | 3 | 4 | 5 | 5 | 6 | 6 | 7 | 8 | 9 |
| 10 | 13 | 12 | 12 | 12 | 12 | 11 | 11 | 10 | 11 | 10 | 10 | 9 | 9 | 9 | 8 | 8 |
| | 7 | 6 | 6 | 6 | 6 | 5 | 5 | 4 | 5 | 4 | 4 | 4 | 4 | 4 | 4 | 4 |
| | 0 | 1 | 1 | 2 | 2 | 3 | 3 | 3 | 4 | 4 | 5 | 5 | 6 | 6 | 7 | 7 | 8 |

TABLE 3-1-continued

| COLOR M | COLOR C | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 11 | 13 | 12 | 12 | 12 | 11 | 11 | 11 | 10 | 10 | 10 | 10 | 10 | 9 | 9 | 8 | 8 |
| | 8 | 7 | 7 | 7 | 6 | 6 | 6 | 5 | 5 | 5 | 5 | 5 | 5 | 5 | 5 | 5 |
| | 0 | 1 | 1 | 2 | 2 | 3 | 3 | 3 | 4 | 4 | 5 | 6 | 6 | 7 | 7 | 8 |
| 12 | 12 | 11 | 11 | 11 | 11 | 11 | 10 | 10 | 10 | 9 | 10 | 9 | 9 | 8 | 8 | 8 |
| | 8 | 7 | 7 | 7 | 7 | 7 | 6 | 6 | 6 | 5 | 6 | 5 | 5 | 5 | 5 | 5 |
| | 0 | 1 | 1 | 2 | 2 | 3 | 3 | 3 | 4 | 4 | 5 | 5 | 6 | 6 | 7 | 8 |
| 13 | 12 | 11 | 11 | 11 | 11 | 10 | 10 | 10 | 10 | 9 | 9 | 9 | 9 | 9 | 8 | 8 |
| | 9 | 8 | 8 | 8 | 8 | 7 | 7 | 7 | 6 | 6 | 6 | 6 | 6 | 6 | 6 | 6 |
| | 0 | 1 | 1 | 2 | 2 | 3 | 3 | 3 | 4 | 4 | 5 | 5 | 6 | 6 | 7 | 8 |
| 14 | 12 | 11 | 11 | 11 | 11 | 10 | 10 | 9 | 10 | 9 | 9 | 8 | 9 | 8 | 7 | 7 |
| | 10 | 9 | 9 | 8 | 8 | 8 | 8 | 7 | 7 | 7 | 7 | 6 | 7 | 6 | 6 | 6 |
| | 0 | 1 | 1 | 2 | 2 | 3 | 3 | 3 | 4 | 4 | 5 | 5 | 6 | 6 | 6 | 7 |
| 15 | 11 | 10 | 10 | 10 | 10 | 9 | 9 | 9 | 9 | 8 | 8 | 8 | 8 | 7 | 8 | 7 |
| | 10 | 9 | 9 | 9 | 9 | 8 | 8 | 8 | 8 | 7 | 7 | 7 | 7 | 6 | 7 | 7 |
| | 0 | 1 | 1 | 2 | 2 | 3 | 3 | 3 | 4 | 4 | 5 | 5 | 6 | 6 | 7 | 7 |
| 16 | 11 | 10 | 10 | 10 | 10 | 9 | 9 | 9 | 9 | 8 | 8 | 8 | 8 | 7 | 7 | 7 |
| | 11 | 10 | 10 | 10 | 10 | 9 | 9 | 9 | 9 | 8 | 8 | 8 | 8 | 7 | 7 | 7 |
| | 0 | 1 | 1 | 2 | 2 | 3 | 3 | 3 | 4 | 4 | 5 | 5 | 6 | 6 | 7 | 7 |
| NOTE DOT NUMBER | Y M C | Y M C | Y M C | Y M C | Y M C | Y M C | Y M C | Y M C | Y M C | Y M C | Y M C | Y M C | Y M C | Y M C | Y M C | Y M C |

Figure 4:
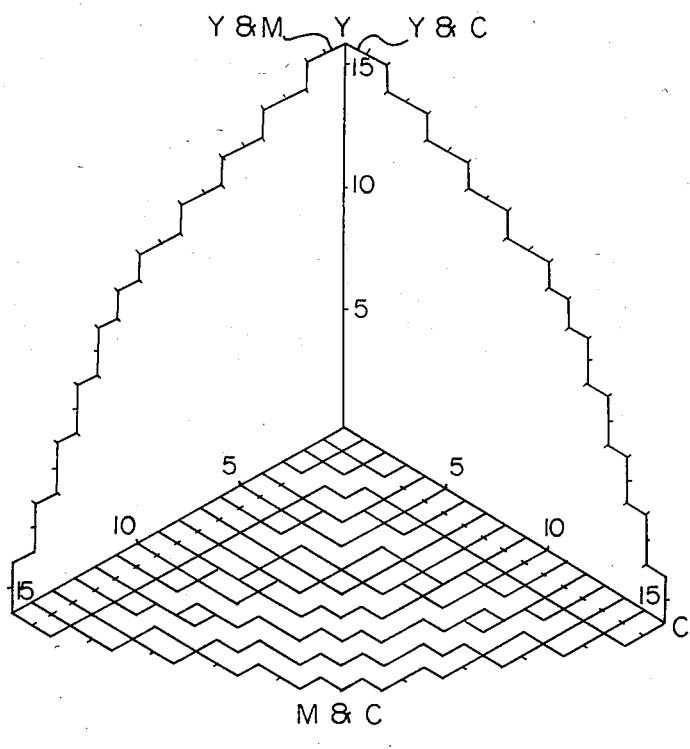
FIG. 4 is a three-dimensional graph indicating the numbers of dots of different colors allocated to the matrix.

The numbers of elements of different colors in the pattern are shown in FIG. 4 and Table 2, taking the mixture of two colors for example. In Table 2, columns COLOR 1 and COLOR 2 indicate input signal levels of the respective colors (1–16), while the numerical values in each column represents the numbers of dots of COLOR 1 at the left and the number of dots of COLOR 2 at the right. It will be seen from Table 2 that eleven dots are printed out in each of the colors when the input levels of both COLORS 1 and 2 are highest, twenty-two dots in total. Due to the 4×4 dot matrix arrangement, the number of superposed dots is suppressed to the minimum, six. In this embodiment, because eleven dots are printed out in each color when both the two color levels are "16", the values which hold when the two color levels are equal are sequentially reduced at the same rate (refer to the equal level items in Table 2). When the input level of one color is minimum, "1", the value is held as it is because no change is required, even when the other input level is maximum. Each halftone is sequentially and smoothly changed over the range from the case where the input level of one color is minimum to the case where it is equal to the other. In Table 2, approximation is made on a line color by color. The opposite sides with respect to the axis defined by the equal levels are symmetrical to each other. This allows halftones to be smoothly reproduced as a whole.

The matrix pattern of dot numbers shown in Table 2 and FIG. 4 will be described.

Figure 3:
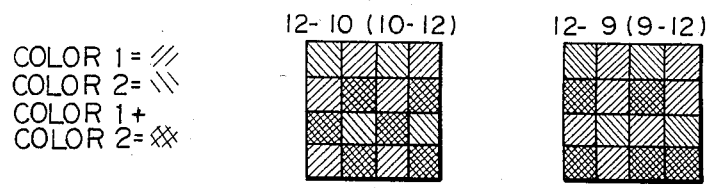

In a region where the number of dots is relatively small, it is permissible to use the pattern shown in FIG. 2 for each of the colors. However, because the number of superposed dots should preferably be as small as possible, the pattern of FIG. 2 is used for COLOR 1 and a modified version of such a pattern for COLOR 2. The modification may be effected by rotating the pattern by 90 degrees, shifting the pattern by one element either vertically or horizontally, making the pattern symmetrical with respect to a horizontal or vertical line, or the like. In a region where the dot number is relatively large, some modification is required due to the limited number of allowable superposed dots (refer to FIG. 3).

The principle discussed above in conjunction with mixture of two colors (Y and M, M and C, or C and Y) applies in the same manner to mixture of three colors (Y, M and C). What should be born in mind in the case of three color mixture is that, when the input levels of the three colors are equal, the color is achromatic and requires replacement of the dots by an equal amount of BK dots. Likewise, BK dots are added in accordance with the minimum values of the three color input levels (preparation of "black plate" as called in the field of printing) while reducing the dots of Y, M and C accordingly (under color removal). In the art of ink jet printers and the like, due to the limited maximum number of dots in the matrix, the amount of black (number of BK dots) is suppressed and larger amounts of under colors are removed, compared to the usual practice in the printing industry. (The amount of under color removal is about several tens of percent of the amount of black in the printing industry, but preferably 100% in the field of ink jet printing to which the present invention belongs.)

In Tables 3-1 and 3-2, the black plate is not used in showing dot numbers of the respective colors for input levels of M and C when the input level of Y is highest (16), for the purpose of facilitating understanding of the present invention.

Figure 5:
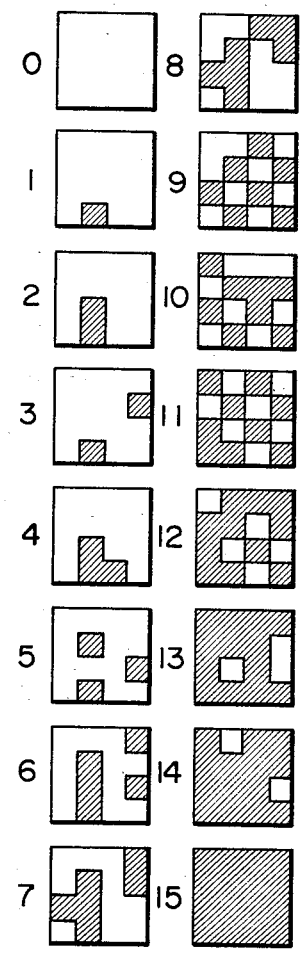
FIG. 5 is a plan view of dot patterns allocated to a matrix.

The numbers of dots have been shown and described as being corresponding to the levels 1–16 for simplicity. In an ink jet printer, one dot is dimensioned larger than one element of the matrix so that, in the case of the patterns shown in FIG. 2, the resulting density will become higher than the actual density. To overcome this problem, patterns in which areas occupied by dots in the matrix have linear interrelationship are selected in one to one correspondence with the various levels. Examples of such patterns are shown in FIG. 5. In FIG. 5, the minimum level input is "0" in which case nothing will be printed out. While for the patterns shown in FIG. 2 a signal is fed to the pattern generator or the print color circuit in response to "0" level input signal to prevent a dot of the specified color from being printed out, the input to an ordinary matrix selection circuit is available for print control when "0" level is taken into account as shown in FIG. 5 (gradation is decreased by one tone).

The patterns prepared by the above procedure are stored in the pattern generator. Meanwhile, interrelationship between input signals and patterns to be printed out are stored in the matrix selector based on Tables 2 or 3-1 and 3-2. The print control reads data out of the pattern generator in accordance with the dot print sequence of the ink jet printer, thereby controlling the operation of the printer.

Figure 6:
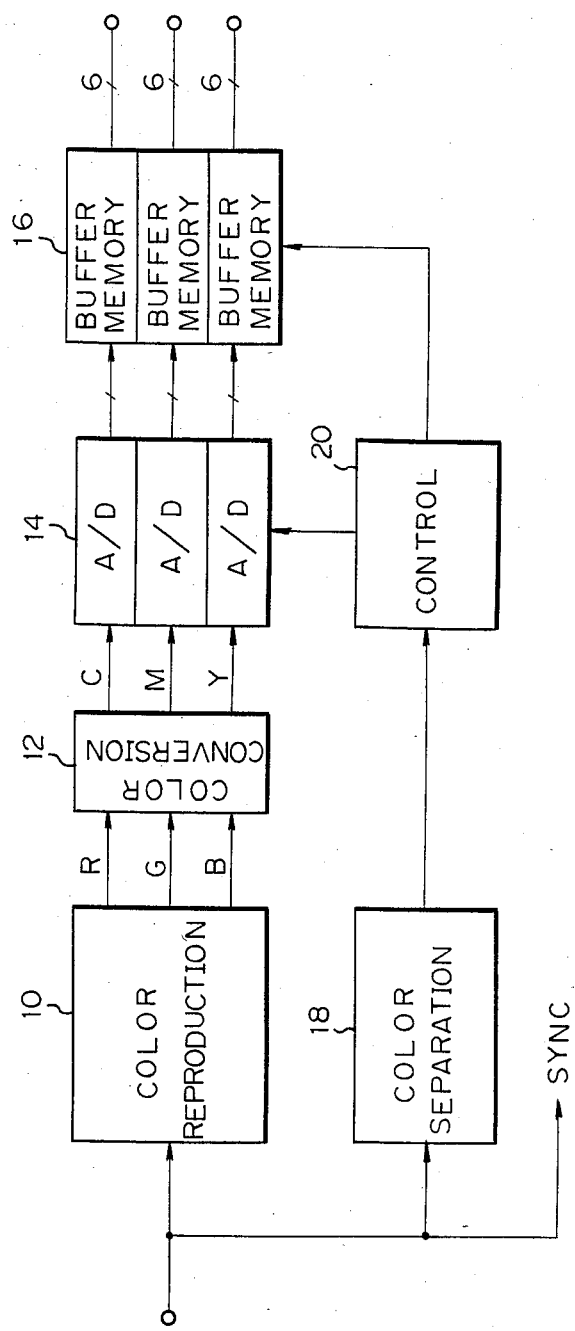
FIGS. 6 and 7 are block diagrams of an apparatus for practicing a multicolor ink jet recording method embodying the present invention.

FIG. 6 shows an apparatus for preparing three-color, density indication color print signals out of a video signal. Shown in FIG. 7 is an apparatus for controlling the operation of an ink jet printer (having four heads, Y, M, C and BK) in response to the density indication color print signals, that is, an apparatus for practicing the method of the present invention.

Referring to FIG. 6, a sync signal is separated from a TV (video) signal. A color reproduction circuit 10 separates R, G and B signals from the TV signal by a known signal processing method. A color conversion circuit 12 transforms the R, G and B signals into C, M and Y signals which are complementary thereto. 6-bit analog-to-digital (A/D) converters 14 respectively code the C, M and Y signals in accordance with the input signal levels. The coded signals are entered into buffer memories 16 (frame memories) 16 respectively.

Figure 7:
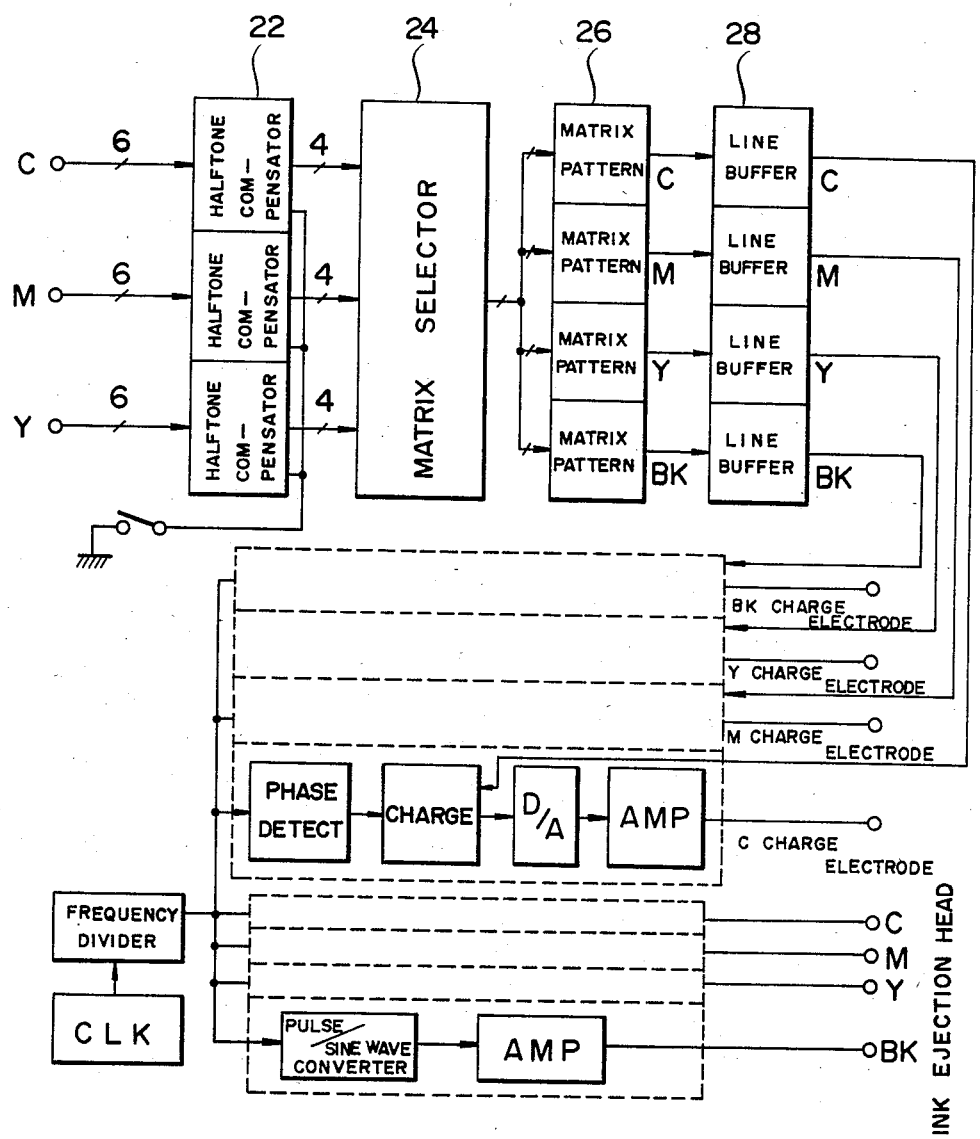

Referring to FIG. 7, the data stored in the memories 16 are individually read out therefrom. The 6-bit×3 (colors) codes thus read out are individually compensated by halftone compensators 22 in a manner which suits specific matrix characteristic of the ink jet printer, thereby being converted into 4-bit codes. The 4-bit Y, M and C codes are commonly fed to a matrix selector 24, which comprises a read only memory (ROM). The matrix selector 24 delivers an address of a selected matrix pattern by means of an address having 4×3=12 bits. That is, a certain matrix pattern is selected in accordance with the levels of the four bits of the respective signals Y, M and C. The matrix patterns have already been described. The Y, M and C signals are transformed into Y, M, C and BK dot information by the designation of a matrix pattern and such dot information is stored in line buffers allocated to the respective colors.

After one line of dot information has been stored, a carriage loaded with Y, M, C and BK heads is caused to reciprocate while the printing operation is controlled based on the data in the line buffers. These operations are repeated for printing subsequent lines. FIG. 7 shows an example in which data are printed out by a charge control type ink jet printer.

In this manner, the embodiment described above limits an allowable maximum number of elements in a matrix in which dots are to be printed out one upon another, or limits the maximum number of dots to be printed out in a matrix, and assigns numbers of print dots to the respective colors within the limited range. This limits the number of print dots in the matrix thereby preventing the ink from flowing as has occurred in the prior art apparatus. Also, the range available for the reproduction of gradation is essentially increased because the number of print dots in each color is determined within the control range.

Other embodiments of the present invention will be described hereinafter.

As well known in the art, the dither method is capable of providing visible images in halftones by regulating the density of dots to be printed out on a recording medium. To apply the dither method to color image plotting, the levels of different color video signals may be individually compared with threshold values allocated thereto while varying the threshold values with time. A problem encountered with this application of the dither method is that, if the thresholds are varied simply at random, the frequency of superposition of a plurality of dots in a same position on a recording medium is increased to lower the chroma of the resulting color image.

Other embodiments of the present invention will be described which are applied to an ink jet color plotter. The description, focusing to the plotter, will more definitely show the drawback particular to the prior art method described above.

Figure 8:
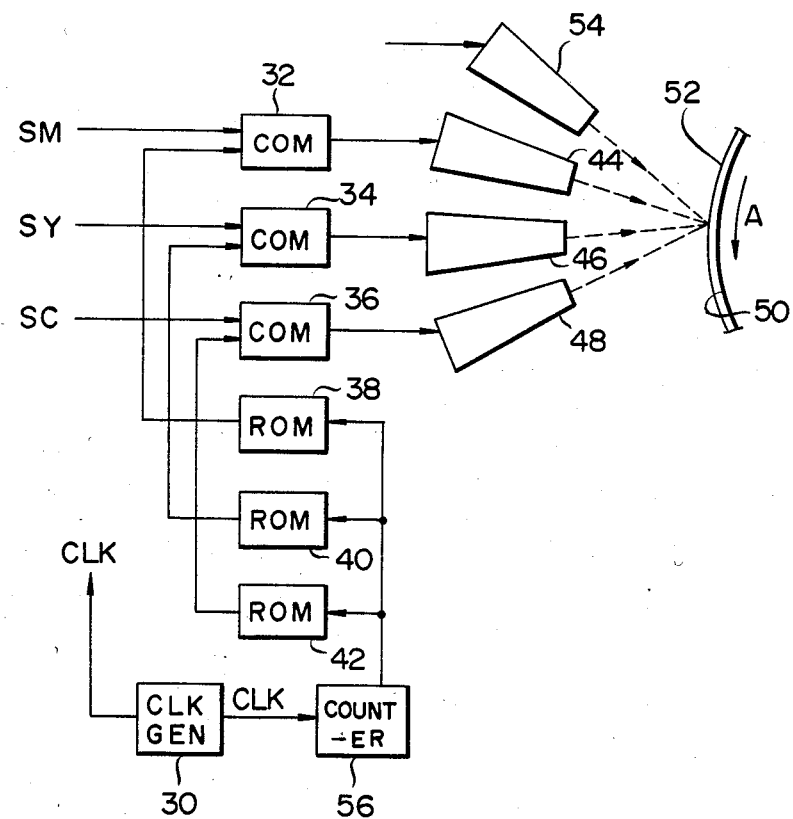
FIG. 8 is a diagram representing another method in accordance with the present invention.

In a reader for reading an original image (not shown), an original image (not shown) is decomposed into pixels (hereinafter referred to as "original pixels"), while video signals representing magenta, yellow and cyan are produced from each of the original pixels. The video signals are temporarily stored in a storage (not shown) and, thereafter as shown in FIG. 8, are, respectively fed to comparators 32, 34 and 36 timed to clock pulses CLK. Also fed to the comparators 32, 34 and 36 are threshold values which are individually read out of read only memories (ROMs) 38, 40 and 42. The comparators 32, 34 and 36, therefore, respectively compare the levels of the input video signals SM, SY and SC with the thresholds (in this embodiments, the levels of the video signals are the density levels of an original pixel). If the video signals SM, SY and SC are higher than the threshold levels, their associated comparators 32, 34 and 36 individually produce logical "1" signals and, if otherwise, logical "0" signals. In response to the logical "1" outputs of the comparators 32, 34 and 36, plotters associated therewith, i.e., a plotter 44 for magenta, a plotter 46 for yellow and a plotter 48 for cyan are activated to eject ink from nozzles thereof to print out dots in a same position on a recording medium 52, which is a sheet wound around a drum 50. When the original pixel is black, a decision circuit (not shown) identifies it to activate a plotter 54 for black so that a black dot may be printed out on the sheet 52. Where the plotters 54, 44, 46 and 48 are incapable of printing out dots in a same position on the sheet 52 due to a specific arrangement thereof, the video signals of different colors may of course be transferred at different timings to the associated plotters in order to print out dots in the same position on the sheet.

In the manner described above, one pixel is formed on the sheet 52 (this pixel will be referred to as "record pixel" as distinguished from the "original pixel"). Such a procedure is repeated along the axis of the drum 50 (main scan), while the drum 50 rotates as indicated by an arrow A (subscan), so that a two-dimensional color image is reproduced on the sheet 52. Alternatively, an arrangement may be made such that record pixels are formed in a line along the circumference of the drum (main scan) and such a line is sequentially formed along the axis of the drum (subscan).

As previously described, the dither method has been used to draw an image in halftones on the sheet 52. One example of the prior art dither method will be discussed together with its drawback, employing the construction shown in FIG. 8.

When the density of an original pixel has a medium level, a video signal having a medium level is fed to a comparator and, if its level is higher than a threshold, a plotter associated with the comparator prints out a dot. When video signals having a same medium level are continuously supplied to the comparator and if the threshold level is fixed, dots will be continuously printed out on a sheet or no dot will be printed out at all, disenabling halftones of the original pixel to be reproduced.

The dither method is successful to overcome the problem discussed above. The following measure has heretofore been adopted to realize the dither method. Each of the ROMs 38, 40 and 42 stores therein a matrix of threshold values such as one shown in FIG. 9, which is a 4×4 matrix having thresholds or elements 1-16. The threshold values in the matrix vary in an irregular manner. The matrix is addressed in a direction j by a counter 56 adapted to count clock pulses which are generated by a clock pulse generator 30 with the same phase as the transfer of each video signal. In a direction i, it is addressed by a line sync which identifies each main scan line. For example, during a main scan period for a line whose address in the direction i is 1, the thresholds 1, 9, 3 and 11 in the i=1 row of the matrix are sequentially and repeatedly read out in this order to be compared with the successive video signals. As soon as the counter 56 is incremented to a predetermined value, a line sync is produced to change the address in the i direction to 2 so that the threshold values in the i=2 row of the marrix are read out in the same manner. The address in the i direction is sequentially shifted in this way down to 4 every time a main scan is completed. Therefore, the comparators 32, 34 and 36 are sequentially supplied with a threshold which varies substantially at random and is compared with each video signal. This prevents the plotters 44, 46 and 48 from operating in a fixed manner or not operating at all. The plotters, therefore, are allowed to print out dots on a sheet to a density which corresponds to the halftone original image, thereby reproducing a halftone image on the sheet. Assuming that a video signal of level 8 is continuously input into a comparator, the threshold to be compared therewith changes with time in the order of 1, 9, 3, 11 . . . causing the output of the comparator to vary in the order of logical "1", "0", "1", "0" . . . As a result, a halftone image is reproduced on the sheet. It will thus be seen that the dither method can reproduce halftones despite that the density of a recorded pixel is displayed in a stepwise manner (one or zero).

Now, where an original pixel is gray or a mixture of a plurality of colors, two or more of the plotters 44, 46 and 48 are often activated at the same time to print out dots in a same position on a sheet to form a single recorded pixel. For example, three video signals SM, SY and SC obtained from a gray pixel having a medium density are commonly medium in level. Assuming that such video signals are individually compared by the comparators 32, 34 and 36 with the uppermost, leftmost element in the matrix of FIG. 9, i.e., threshold 1, the comparators individually produce logical "1" signals due to the small value (=1) of the threshold, thereby driving the three plotters 44, 46 and 48 to print out three dots one upon another in a same position on a sheet. However, superposing a plurality of colors on a sheet brings about a decrease in chroma which causes the color to appear dark and, therefore, poor in quality. Stated another way, the ideal situation is such that recorded pixels in the form of dots of different colors are appropriately scattered in an image which is reproduced from an original gray or mixed-color image of a medium density, which has been difficult to realize.

As also known in the art, different threshold matrixes may be stored in the ROMs 38, 40 and 42 to supply each of the comparators with threshold values from specific one of the matrixes. This, however, cannot eliminate the decrease in the chroma of the recorded pixel either. Let it be assumed that the matrix shown in FIG. 9 is stored in one ROM and a different matrix in another ROM. Then, when the threshold 1 in the uppermost, leftmost element of FIG. 9 is fed to one of the comparators to be compared with a video signal having a medium level, the comparator usually produces a logical "1" signal without fail. However, it is not sure that another comparator does not produce a logical "1" signal at that instant.

The construction in accordance with the present invention alleviates the situation stated above. The ROMs 38, 40 and 42 respectively store, for example, matrixes of threshold values 1-16 shown in FIGS. 10a, 10b and 10c. Each of the matrixes is addressed in exactly the same manner as in the prior art method already described. The thresholds in each of the matrixes are sequentially supplied to the associated comparator 32, 34 or 36 timed to the clock signal CLK. A characteristic feature of the present invention is that the thresholds in the three matrixes are selected and arranged such that the sums of corresponding thresholds are substantially equal to each other. For example, the sum of the elements in the position i=1, j=1 in the matrixes of FIGS. 10a-10c is 1+11+15=27, that of the elements in the position i=1, j=2 is 7+7+13=27, and that of the elements in the position i=1, j=3 is 12+5+8=25. As will become clear from further description, such a matrix arrangement reduces the probability that two or three of the comparators 32, 34 and 36 produce logical "1" signals in response to incoming medium level video signals picked up from a common original pixel. In detail, assume that the thresholds in the elements i=1, j=1 in the three matrixes are fed to the respective comparators while all the video signals SM, SY and SC to be compared therewith have the level 8. Then, the comparator 32 produces a logical "1" signal because the threshold in the first matrix of FIG. 10a is "1" (8>1). The other two comparators 34 and 36 commonly produce logical "0" signals because the thresholds in the second and third matrixes of FIGS. 10b and 10c are 11 and 15, respectively (8<11, 8<15). Under this condition, therefore, only the plotter 44, for magenta is activated to print out a record pixel in a single color. This also applies to the thresholds at positions i=2, j=4 (8<9, 8<15, 8>1), causing only the comparator 36 to produce a logical "1" signal to activate the cyan plotter 48 only. Although two or more of the plotters 44, 46 and 48 may sometimes operate together depending upon the levels of the video signals or the thresholds, the probability of such an occurrence is surely made lower than in the prior art method. As a result, a color image printed out on a sheet surely attains a higher chroma. Other examples of threshold matrixes stored individually in the ROMs 38, 40 and 42 are shown in FIGS. 11a-11c.

Figure 12:
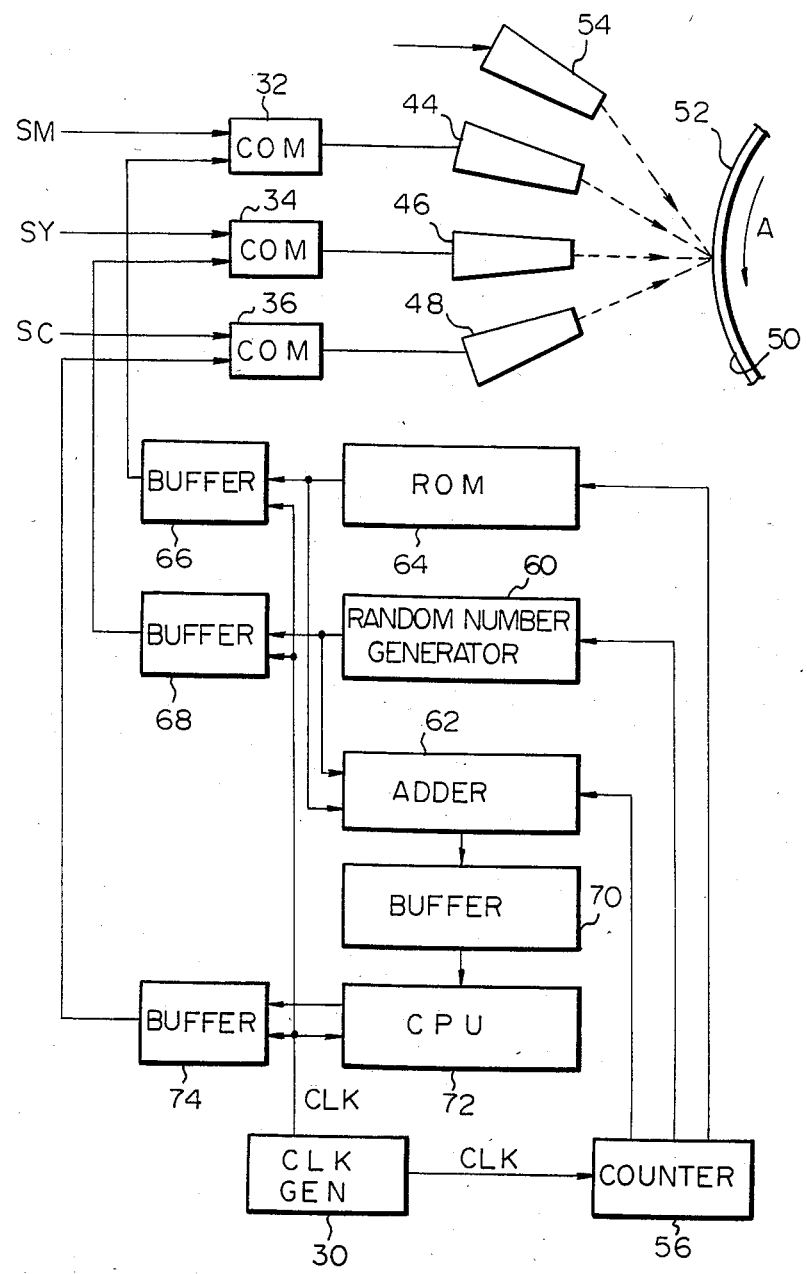
FIG. 12 is a block diagram of another embodiment of the present invention.

Another embodiment of the present invention is shown in FIG. 12 which achieves the above-described effect by use of a single threshold matrix 64, a random number generator 60 and an adder 62, instead of the three matrixes.

In FIG. 12, one ROM 64 stores a threshold matrix having numerical values in the positions thereof which are predetermined to vary from each other in an irregular manner. In this embodiment, the threshold matrix has the arrangement shown in FIG. 10a. A counter 56 counts clock pulses CLK output from the clock pulse generator 30, while a ROM 64 sequentially delivers thresholds sequentially therefrom timed to the clock pulses CLK, as has been described in conjunction with the preceding embodiment. In this instance, the thresholds are sequentially entered into a buffer memory 66.

Meanwhile, the random number generator 60 generates random numbers in a manner known per se in synchronism with the counter 56. The random numbers are sequentially stored in a second buffer memory 68. Where the threshold matrix stored in the ROM 64 is in a 4×4 arrangement as in this particular embodiment, the random generator 60 generates sixteen random numbers, 1–16 which correspond to the number of the matrix elements.

The adder 62 adds each threshold output from the ROM 64 to a random number which is output from the random number generator 60 timed to the threshold. All the sums (4×4 sums in this embodiment) are stored in a buffer memory 70 and then fed to a central processing unit (CPU) 72. The CPU 72 ranks the outputs of the buffer memory 70 from the largest to the smallest and assigns thresholds 1–16 in the same order. The thresholds 1–16 are transferred to a buffer memory 74 timed to the clock pulses CLK. At this instant, the thresholds 1–16 are sequentially fed from the CPU 72 to the buffer memory 74 such that the sum of three values input to the buffer memories 66, 68 and 74 at the same timing remains substantially constant. For example, assume that the thresholds in the matrix of FIG. 10a stored in the ROM 64 are sequentially fed to the buffer memory 66 in the same order as in the previously described embodiment, and that the thresholds of the matrix shown in FIG. 10b are sequentially fed to the buffer memory 68 in the same order as in the previously described embodiment. The sums of the corresponding elements in the matrixes shown in FIGS. 10a and 10b in such a situation are shown in FIG. 13. Because the smallest value in the matrix shown in FIG. 13 is 11 (i=1, j=4), the CPU 72 will supply the buffer memory 74 with the largest threshold 16 of the thresholds 1–16 when the ROM 64 or the random number generator 60 delivers the thresholds i=1, j=4 in the matrixes of FIGS. 10a and 10b. The second smallest value in the matrix of FIG. 13 is 12 (i=1, j=1) so that, when the ROM 64 or the random number generator 60 produces the thresholds i=1, j=1 in the matrixes of FIGS. 10a and 10b, the CPU 72 will deliver the second largest threshold 15. This procedure is repeated to cause the CPU 72 to produce the thresholds in the matrix of FIG. 10c in the same sequence as the thresholds output from the ROM 64. Therefore, the sum of values sequentially output from the CPU 72 and those of the respective elements of the matrixes shown in FIGS. 10a and 10b are nearly equal to each other.

Next, as discussed in the preceding embodiment, the thresholds stored in the buffer memories 66, 68 and 74 are sequentially sent out to the comparators 32, 34 and 36 in synchronism with the clock pulses CLK to be compared with the video signals SM, SY and SC respectively. While in the matrix shown in FIG. 13 some elements have identical sums of thresholds, the thresholds corresponding to them and output from the CPU 72 may be delivered in any desired order.

Although the description has been directed to an ink jet color plotter, it will be apparent that the present invention is widely applicable to an electrostatic recording apparatus, a laser electrophotographic recording apparatus, or like plotter. Usually, these plotters do not form visible images directly and, instead, form latent images by forming dots on a recording medium (e.g. photoconductor or dielectric) and then process the latent images to make them visible. Therefore, the dots just after being formed on the medium are not visible as is the case with ink jet printing. Further, the present invention effectively finds applications to plotters which provide images in two different colors, as well as to three-color (four-color inclusive of black) plotters. The present invention is applicable even to recording of color images with video signals output from a computer.

Concerning a plotting system which represents a shade of color in terms of forming or not forming a dot on a medium, the applicable range of the present invention even includes a plotting method which performs a control over more than two stges, in addition to the two-stage control shown and described which forms or does not form a dot of a predetermined size. While the levels of video signals have represented the densities of original pixels in the embodiments shown and described, it is permissible to compare the brightness levels of original pixels (opposite in relation to density levels) with threshold values. Furthermore, the 4×4 matrix is only illustrative and may be replaced with any other desired matrix arrangement.

Various modifications will become possible for those skilled in the art after receiving the teachings of the present disclosure without departing from the scope thereof.

What is claimed is:

1. A multicolor ink jet recording apparatus comprising:

ink jet head means for printing an image by superposing individual dot matrices of at least two colors; and computing means for receiving electrical input signals representing said image and generating and feeding corresponding electrical signals representing said individual dot matrices of said at least two colors to the head means for printing, the computing means comprising matrix generator means for generating said individual dot matrices in such a manner that the total number of dots to be printed in the superposed individual dot matrices is limited to a first predetermined value which is less than the maximum possible total number of dots which can be printed in the superposed individual dot matrices, and in such a manner that the total number of dots to be printed in the superposed individual dot matrices which are formed by superposed dots of different colors is limited to a second predetermined value which is less than said first predetermined value.

2. A multicolor ink jet recording apparatus as claimed in claim 1, which said input signals comprise individual signals corresponding to said at least two colors respectively.

3. A multicolor ink jet recording apparatus as claimed in claim 2, in which the matrix generator means comprises memory means for receiving said individual signals corresponding to said at least two colors as inputs and producing said signals representing said individual matrices of said at least two colors respectively as outputs.

4. A multicolor ink jet recording apparatus as claimed in claim 2, in which the matrix generator means comprises dither matrix means.

5. A multicolor ink jet recording apparatus as claimed in claim 4, in which the dither matrix means comprises, for each of said at least two colors, memory means for storing a dither matrix and threshold means for comparing values of said respective individual input signals with values in corresponding positions in the dither matrix, the threshold means producing a first or second logical output in accordance with whether an input signal is higher or lower than the corresponding value in the dither matrix.

6. A multicolor ink jet recording apparatus as claimed in claim 5, in which the dither matrices are predetermined in such a manner that sums of values in corresponding positions in all of said matrices are substantially equal.

7. A multicolor ink jet recording apparatus as claimed in claim 4, in which said at least two colors comprises three colors, the dither matrix means comprising memory means for storing a dither matrix having different values in positions thereof ranging from a minimum value to a maximum value, random number generator means for generating random numbers ranging from said minimum value to said maximum value, adder means for adding together output values from the memory means and the random number generator means, and processor means for ranking output values of the adder means in numerical order, the processor means producing output values ranging from said minimum value to said maximum value corresponding to respective output values from the adder means in such a manner that the output values of the processor means are ranked in inverse relation to corresponding output values of the adder means; and three threshold means for comparing values of said respective input signals corresponding to said three colors with output values in corresponding positions in the dither matrix memory means, the adder means and the processor means respectively, each threshold means producing a first or second logical output in accordance with whether an input signal is higher or lower than the corresponding output value from the memory means, adder means and processor means respectively.

8. A multicolor ink jet recording apparatus as claimed in claim 7, in which the dither matrix means is constructed in such a manner that sums of output values of the memory means, adder means and processor means are substantially equal.

* * * * *